United States Patent [19]

Soerens

[11] Patent Number: 4,788,243

[45] Date of Patent: Nov. 29, 1988

[54] CREPING ADHESIVES CONTAINING POLYVINYL ALCOHOL AND THERMOPLASTIC POLYAMIDE RESINS DERIVED FROM POLY(OXYETHYLENE) DIAMINE

[75] Inventor: Dave A. Soerens, Neenah, Wis.

[73] Assignee: Kimberly-Clark Corporation, Neenah, Wis.

[21] Appl. No.: 35,700

[22] Filed: Apr. 8, 1987

Related U.S. Application Data

[62] Division of Ser. No. 917,640, Oct. 8, 1986, Pat. No. 4,684,439.

[51] Int. Cl.$^4$ ............................................. C08L 29/04
[52] U.S. Cl. ..................................... 524/503; 525/58
[58] Field of Search ........................... 524/503; 525/58

[56] References Cited

U.S. PATENT DOCUMENTS

| 3,980,605 | 9/1976 | Steigelmann et al. | 524/503 |
| 4,235,764 | 11/1980 | Dereser et al. | 524/503 |
| 4,464,505 | 8/1984 | Kawakami et al. | 524/503 |
| 4,514,540 | 4/1985 | Peck | 524/503 |
| 4,528,316 | 7/1985 | Soerens | 524/503 |

FOREIGN PATENT DOCUMENTS

| 0039226 | 11/1981 | European Pat. Off. | 524/503 |
| 0039277 | 10/1976 | Japan | 524/503 |
| 0131246 | 8/1982 | Japan | 524/503 |
| 0255841 | 12/1985 | Japan | 524/503 |

Primary Examiner—Joseph L. Schofer
Assistant Examiner—J. M. Reddick
Attorney, Agent, or Firm—Gregory E. Croft

[57] ABSTRACT

An improved wettable creping adhesive comprises an aqueous admixture of polyvinyl alcohol and a water-soluble thermoplastic polyamide resin comprising the reaction product of a polyalkylene polyamine, a saturated aliphatic dibasic carboxylic acid, and a poly(oxyethylene) diamine.

7 Claims, No Drawings

CREPING ADHESIVES CONTAINING POLYVINYL ALCOHOL AND THERMOPLASTIC POLYAMIDE RESINS DERIVED FROM POLY(OXYETHYLENE) DIAMINE

This is a divisional of co-pending application Ser. No. 06/917,640 filed on Oct. 8, 1986, now U.S. Pat. No. 4,684,439.

BACKGROUND OF THE INVENTION

In the manufacture of tissue products such as facial tissue, bath tissue, and paper toweling, softness is imparted to the product by adhering the web to a rotating creping cylinder and thereafter dislodging it from the creping cylinder with a doctor blade. In order for the creping process to be effective, it is necessary to obtain proper adhesion between the web and the creping cylinder, which is generally achieved by the addition of a creping adhesive. Very small amounts of adhesive are applied per revolution of the creping cylinder. For good creping, an adhesive coating must build up on the surface of the dryer and is continuously renewed during each revolution of the dryer as a small amount is removed by the doctor blade and replaced by freshly applied adhesive. The newly applied adhesive is incorporated into the existing coating, which is reactivated by taking on moisture from the fresh application. Therefore, rewettability is an important property of a good creping adhesive.

In an effort to seek new and improved creping adhesives, a water-soluble, thermosetting, cationic polyamide resin creping adhesive was developed as described in U.S. Pat. No. 4,501,640 to Soerens. However, although such a creping adhesive exhibits good adhesion, the thermosetting nature of such adhesives works against rewettability because after cross-linking (curing) the addition of moisture is no longer able to soften and conform the coating sufficiently to optimally bond with the tissue web at the pressure roll nip.

Therefore there is a need for an improved method of creping cellulosic webs which uses a creping adhesive exhibiting improved wettability.

SUMMARY OF THE INVENTION

It has now been discovered that a creping adhesive comprising an aqueous admixture of polyvinyl alcohol and a water-soluble, thermoplastic polyamide resin derived from poly(oxyethylene) diamine exhibits improved wettability and therefore improved performance in the creping process.

In one aspect, the invention resides in a creping adhesive comprising an aqueous admixture of polyvinyl alcohol and a water-soluble thermoplastic polyamide which is the reaction product of a polyalkylene polyamine, a saturated aliphatic dibasic carboxylic acid, and a poly(oxyethylene) diamine.

The polyvinyl alcohol component can be of any water-soluble molecular weight sufficient to form an adhesive film. Generally, a weight average molecular weight of from about 90,000 to about 140,000 is preferred. Polyvinyl alcohol in solid form is commercially available under several trademarks such as GELVATOL® (Monsanto), VINOL® (Air Products), ELVANOL® (DuPont) and POVAL® (Kuraray). Suitable commercially available grades have a viscosity of from about 13 to about 50 centipoise for a 4% aqueous solution at 20° C. These grades have a degree of hydrolysis of from about 80 to about 99.9 percent. Those skilled in the art will appreciate that lowering the degree of hydrolysis and the molecular weight will improve water solubility but will reduce adhesion. Therefore the properties of the polyvinyl alcohol will have to be optimized for the specific application.

The water-soluble thermoplastic polyamide resin component of the creping adhesive comprises a reaction product of a polyalkylene polyamine, a saturated aliphatic dibasic carboxylic acid, and a poly(oxyethylene) diamine. The polyalkylene polyamine component has the formula

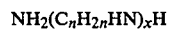

$$NH_2(C_nH_{2n}HN)_xH$$

wherein n and x are each integers of 2 or more. The aliphatic dibasic carboxylic acid component has the formula

$$HOOC-R-COOH$$

wherein "R" is a divalent aliphatic radical having from 1 to 8 carbon atoms. The poly(oxyethylene) diamine component has the formula

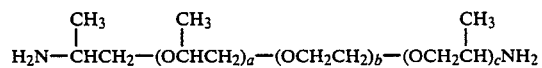

$$H_2N-CHCH_2-(OCHCH_2)_a-(OCH_2CH_2)_b-(OCH_2CH)_cNH_2$$
with CH_3 groups wherein "a" is 1 or 2, "b" is from 5 to 50, and "c" is 1 or 2. Preferably, "a+c" averages about 2.5 and "b" averages about 8.5.

An essential characteristic of the resins of this invention is that they are phase-compatible with the polyvinyl alcohol, i.e., they do not phase-separate in the presence of aqueous polyvinyl alcohol.

In another aspect, the invention resides in a method for creping cellulosic webs comprising (a) applying to a rotating creping cylinder an aqueous admixture containing from about 90 to about 99.95 weight percent water and from about 0.05 to about 10 weight percent solids, wherein from about 20 to about 90 weight percent of said solids is water-soluble polyvinyl alcohol and wherein from about 10 to about 80 weight percent of said solids is a water-soluble, thermoplastic polyamide resin which is phase-compatible with the polyvinyl alcohol, said polyamide resin comprising the water-soluble thermoplastic reaction product of a polyalkylene polyamine, a saturated aliphatic dibasic carboxylic acid, and a poly(oxyethylene) diamine; (b) pressing a cellulosic web against the creping cylinder to effect adhesion of the web to the surface of the cylinder; and (c) dislodging the web from the creping cylinder by contact with a doctor blade. Preferably, the aqueous admixture contains from about 0.1 to about 1.0 weight percent solids.

The invention will be described in greater detail with respect to the specific examples set forth below.

DESCRIPTION OF THE PREFERRED EMBODIMENT

Example 1: Preparation of Polyamide Resin 83 grams (0.8 mole) of diethylene triamine, 146 grams (1.0 mole) of adipic acid, and 180 grams (0.3 mole) of a poly(oxyethylene) diamine (Jeffamine ED 600 manufactured by Texaco Chemical Co. and having the formula described above with "a+c" averaging 2.5 and "b" averaging 8.5) were added to a three-neck resin flask equipped with a mechanical stirrer, thermometer, and a water trap. The solution was heated to 160° C. and water collected over 105 minutes as the temperature rose to 195° C. The total amount of water collected was 30 ml (83.4% of theoretical). The contents of the flask were poured into a pan and cooled, solidifying into a yellow mass having a waxy feel. On standing the solid appeared to absorb water from the air to give a very tacky surface feel. A 2% solution of the product in distilled water at 20° C. had a specific viscosity of 0.19.

Example 2: Preparation of Creping Adhesive

A 5 weight percent aqueous solution of the polyamide prepared in Example 1 was combined with a 5 weight percent aqueous solution of a polyvinyl alcohol (PVA) having a weight average molecular weight of about 120,000 and a degree of hydrolysis of about 86%. The polyamide solution and the PVA solution were combined in various solids weight ratios of PVA/polyamide of from 90/10 to 30/70, respectively. No phase separation was observed in these blends.

Example 3: Water Uptake (Wettability)

Thin films of a 74/26 PVA/polyamide resin blend made as described above (this invention), and a thermosetting polyamide resin (control) were prepared by casting 5 weight percent solution into a silicone rubber mold at room temperature and allowing the water to evaporate. The resultant films, which were about 8 mils in thickness, were cut into strips of about 1×5 inches and "cured" in an oven at 200° F. for 15 minutes. After cooling to room temperature, the film strip was weighed to determine its dry weight. The film sample was then immersed in water at 72° F. for a time of 10, 30, 50, or 90 seconds. The sample was removed from the water on a wire mesh, shaken to remove surface drops of water, and weighed to determine the wet weight. The results are set forth in TABLE I.

TABLE I

| | Water Uptake Rates | |
| --- | --- | --- |
| | Wet Weight/Dry Weight Ratio | |
| Time (Seconds) | Control | This Invention |
| 0 | 1.0 | 1.0 |
| 10 | 1.47 | 1.80 |
| 30 | 1.68 | 1.94 |
| 50 | 1.72 | 2.40 |
| 90 | 2.01 | 2.68 |

As the results illustrate, the thermoplastic films of this invention take up water to a greater extent and at a greater rate than the thermosetting polyamide resin (control).

Example 3: Production of Facial Tissue

Facial tissue was made under controlled laboratory conditions using two different creping adhesives: a 0.1 weight percent solids solution of a blend of PVA and the thermoplastic polyamide of Example 1 in a 74/26 ratio of PVA to polyamide (this invention); and a 0.1 weight percent solids solution of a blend of PVA and a thermosetting polyamide resin in the same ratio (control).

The resulting tissues were tested for softness by a trained sensory panel which, on a 1 to 10 scale, rated the softness of the tissues made in accordance with the method of this invention at 7.2 compared to 6.8 for the control, illustrating improved creping performance.

The same tissue samples were also evaluated for stiffness using a mechanical device which measures the force required to crush a sample to a fixed degree. Measured crush loads were 53.9 grams for the samples made in accordance with this invention versus 64.7 grams for the control, illustrating that the tissues made in accordance with this invention were less stiff.

The foregoing examples illustrate the improved wettability of the thermoplastic polyamide creping adhesives of this invention and the utility of the method of this invention for making creped tissue products.

I claim:

1. A creping adhesive comprising an aqueous admixture of polyvinyl alcohol and a water-soluble, thermoplastic polyamide resin which is phase-compatible with the polyvinyl alcohol, said polyamide resin comprising the reaction product of a polyalkylene polyamine, a saturated aliphatic dibasic carboxylic acid, and a poly(oxyethylene) diamine.

2. The creping adhesive of claim 1 wherein the poly(oxyethylene) diamine has the following formula:

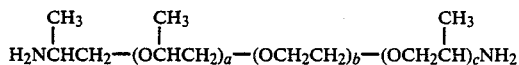

wherein "a" and "c" are each 1 or 2 and "b" is from 5 to 50.

3. The creping adhesive of claim 2 wherein the polyalkylene polyamine has the following formula:

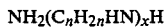

wherein "n" and "x" are each integers of 2 or more.

4. The creping adhesive of claim 3 wherein the saturated aliphatic dibasic carboxylic acid has the formula:

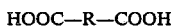

wherein "R" is a divalent aliphatic radical having from 1 to 8 carbon atoms.

5. The creping adhesive of claim 4 wherein the poly(oxyethylene) diamine has the formula:

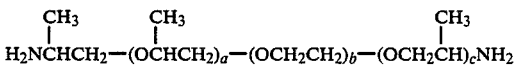

wherein "a" and "c" are each 1 or 2 and "b" has an average value of about 8.5.

6. The creping adhesive of claim 5 wherein the polyalkylene polyamine is diethylene triamine and the saturated aliphatic dibasic carboxylic acid is adipic acid.

7. The creping adhesive of claim 6 wherein the amount of water-soluble thermoplastic polyamide is about 25 weight percent of the solids.

* * * * *